Sept. 9, 1947.                J. E. BROWN                2,427,043
                       SPECTACLE AND EYEGLASS CASE
                            Filed June 16, 1944
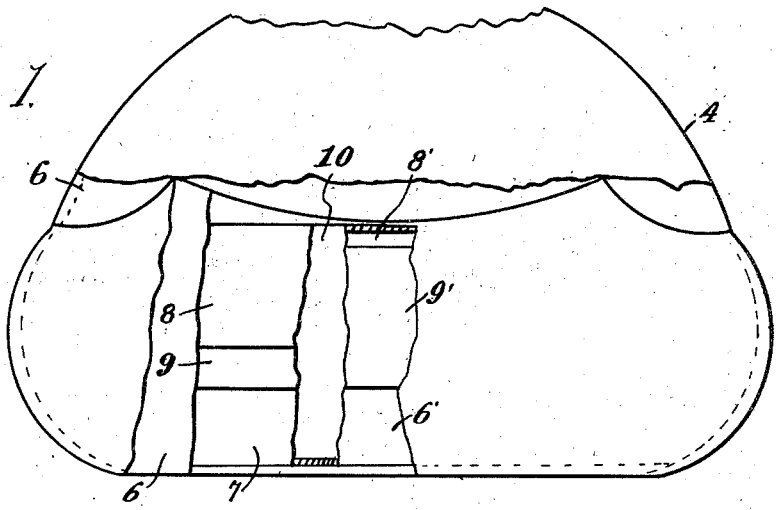
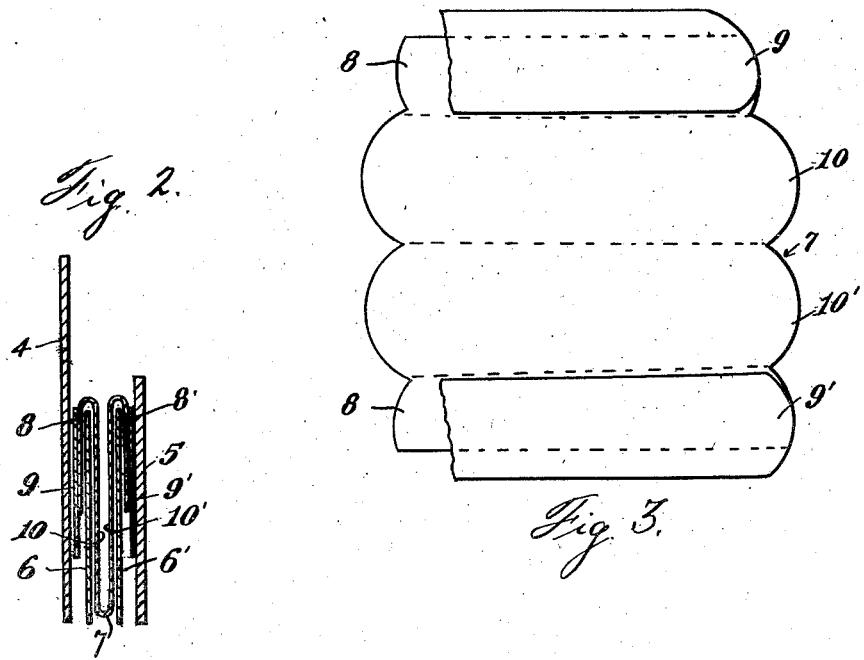
JACK E. BROWN,
                    INVENTOR, Patented Sept. 9, 1947

2,427,043

UNITED STATES PATENT OFFICE 2,427,043

SPECTACLE AND EYEGLASS CASE

Jack E. Brown, Brooklyn, N. Y.

Application June 16, 1944, Serial No. 540,576

1 Claim. (Cl. 206—5)

The present invention relates to improvements in spectacle and eyeglass cases, one object of the invention being the provision of a case provided with a lens wiper in the form of a removable foldable cloth, so constructed as to neatly fit within the case and hold the glasses and yet permit the wiping of the lenses while the glasses are still within the case.

Another object of the invention is the provision of a flexible material case open at the top and bottom, and a removable lens wiper which forms a holding pocket within the case.

With these and other objects in view, and which will be later pointed out in the description and in the scope of the claim, attention is invited to the accompanying drawings, in which:

Figure 1 is an open front view of an eyeglass case made according to this invention, certain portions of the front sheet of the case being broken away to show the various elements that constitute the complete case.

Figure 2 is a cross section through the case with the lens wiper pocket in place.

Figure 3 is a plan view of the lens wiper pocket extended with a portion of the stiffening member broken away.

Referring to the drawings, the numeral 4 designates a sheet of flexible material, which may be leather, fabric, imitation leather, plastic or the like, and 5 designates a sheet that forms when the two sheets are sewn or otherwise attached at their narrow ends, a case open at the top and bottom, throughout, or nearly so, the length of the case.

Secured to the respective inner portion at the ends of sheets 4 and 5, are two sheets 6 and 6', and also along the bottom so as to provide a pocket with each sheet, each pocket being open at the top and bottom and providing each a receptacle for the removable holding of the glass holder and lens wiper 7.

This glass holder and lens wiper sheet is folded on three lines so as to provide two wings 8 and 8', and the two pocket forming wiper walls 10 and 10'. In order to stiffen the two wings 8 and 8' so that these wings may be removably inserted in the respective receptacles or pockets formed by the sheets 4 and 5, and 6 and 6', strips 9 and 9', respectively are attached to and carried by the respective wings 8 and 8'. These strips may be of any light stiff material, such as cardboard, plastic sheets, or even thin metal, and may be attached to the wings in any well known manner, in this particular case by a water-proof adhesive.

From the foregoing description taken in connection with the drawings, it will be seen that the glass holder and lens wiper sheet to be inserted is folded at its center, and with its two wings 8 and 8' outwardly. In this manner, the two sheets 4 and 5 are flexed to permit the center folds to enter from the top so that the center folded portion forms a pocket within the case, the stiffened wings being inserted in the respective pockets formed by the respective sheets 4—6 and 5—6'. Thus the entire case then provides a wiper pocket for the eyeglasses, and permits the thumb and forefinger to be inserted between the lower edges of the sheets 4 and 5, to grip the pocket 7 to manipulate the wiper sheet to clean the lenses while the eyeglass is still within the case.

In the event that the wiper becomes too soiled for further use, a new sheet can be substituted.

The sheets 6 and 6', although here shown as of the same general width of the front wall forming sheet 5, may be narrower to provide holders for the stiffened wings 8 and 8' of the pocket forming wiper. Also inasmuch as the ends of the two portions 10 and 10' are free, the wiper can be freely manipulated in the desired manner to clean the lenses, while still within the case.

What is claimed, is:

An eyeglass case composed of two pieces of flexible material attached at two opposite ends to provide a receptacle open through the bottom and top thereof, two strips attached respectively at two separated portions to the faces of the inner walls of the first two pieces and adjacent the top of the receptacle to provide open holders thereagainst, and a removable member made from a single sheet of wiper material having a plurality of folds to provide four sections, the two middle sections forming an eyeglass receptacle and wiper and the two end sections providing insertible portions to fit into the open holders and support the removable member within the case, the two middle sections of the removable member being accessible to the thumb and forefinger through the open bottom of the case and the flexibility of the case material permitting free movement of the finger and thumb to wipe the eyeglasses while supported within the removable member.

JACK E. BROWN.

REFERENCES CITED

The following references are of record in the file of this patent:

UNITED STATES PATENTS

| Number | Name | Date |
|---|---|---|
| 1,025,372 | Conrad | May 7, 1912 |
| 1,242,187 | Hayden | Oct. 9, 1917 |
| 2,353,413 | Nathan | July 11, 1944 |
| 2,326,615 | Buxton | Aug. 10, 1943 |
| 2,367,182 | Brown | Jan. 16, 1945 |